US012570289B2

(12) United States Patent
Aoyama et al.

(10) Patent No.: US 12,570,289 B2
(45) Date of Patent: Mar. 10, 2026

(54) TRAVELING CONTROL APPARATUS

(71) Applicant: SUBARU CORPORATION, Tokyo (JP)

(72) Inventors: Tsubasa Aoyama, Tokyo (JP); Yoshiyuki Igarashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 173 days.

(21) Appl. No.: 18/348,635

(22) Filed: Jul. 7, 2023

(65) Prior Publication Data

US 2024/0043008 A1    Feb. 8, 2024

(30) Foreign Application Priority Data

Aug. 4, 2022    (JP) ................................. 2022-124944

(51) Int. Cl.
*B60W 30/18* (2012.01)
*B60W 30/095* (2012.01)
*B60W 30/16* (2020.01)

(52) U.S. Cl.
CPC .. *B60W 30/18154* (2013.01); *B60W 30/0956* (2013.01); *B60W 30/16* (2013.01); *B60W 2554/4041* (2020.02); *B60W 2554/4046* (2020.02); *B60W 2554/80* (2020.02)

(58) Field of Classification Search
CPC ....... B60W 30/18154; B60W 30/0956; B60W 30/16; B60W 2554/4041; B60W 2554/4046; B60W 2554/80; B60W 2554/20; B60W 2554/404; B60W 30/18159

USPC ........................................................ 701/41
See application file for complete search history.

(56) References Cited

U.S. PATENT DOCUMENTS

| | | | |
|---|---|---|---|
| 2020/0070826 A1* | 3/2020 | Watanabe | G08G 1/167 |
| 2021/0163039 A1* | 6/2021 | Iwamoto | B60W 60/0015 |
| 2022/0089185 A1* | 3/2022 | Hiramatsu | B60W 30/0956 |
| 2022/0105942 A1* | 4/2022 | Aso | B60W 30/12 |
| 2023/0118619 A1* | 4/2023 | Horihata | G08G 1/167 |
| | | | 340/937 |

FOREIGN PATENT DOCUMENTS

JP          2011-162075 A      8/2011

* cited by examiner

*Primary Examiner* — Scott A Reinbold
(74) *Attorney, Agent, or Firm* — Rimon P.C.

(57) ABSTRACT

A traveling control apparatus that is to be applied to a first vehicle, and includes an obstacle detector, first and second street parking determination processors, first and second target lateral position determination processors, and a traveling control processor. The first and second street parking determination processors each perform, when the obstacle is detected, a determination as to whether the obstacle is a second vehicle that is street-parked. The first and second target lateral position determination processors each perform, when the obstacle is the second vehicle having a high possibility of being street-parked, a determination of corresponding one of first and second target lateral positions of the first vehicle at a time when the first vehicle passes the second vehicle. The traveling control processor executes the traveling control based on results of the determinations performed by the first and second target lateral position determination processors.

7 Claims, 6 Drawing Sheets

TRAVELING CONTROL APPARATUS

CROSS-REFERENCE TO RELATED APPLICATIONS

The present application claims priority from Japanese Patent Application No. 2022-124944 filed on Aug. 4, 2022, the entire contents of which are hereby incorporated by reference.

BACKGROUND

The disclosure relates to a traveling control apparatus. Recently, a driving assistance system that assists a driving operation of a driver who drives a vehicle, such as an automobile, has been put to practical use and has been widespread. Such a driving assistance system helps to allow for safe traveling of the vehicle while reducing a load on a vehicle operation performed by the driver of the vehicle.

This kind of driving assistance system has been advancing. For example, a driving assistance system that performs driving assistance while suppressing a strange feeling given to a driver in accordance with a driving characteristic of the driver has appeared. For example, reference is made to Japanese Unexamined Patent Application Publication (JP-A) No. 2011-162075.

SUMMARY

An aspect of the disclosure provides a traveling control apparatus to be applied to a first vehicle. The traveling control apparatus is configured to execute a traveling control at an intersection at which the first vehicle is to turn right. The traveling control apparatus includes an obstacle detector, a first street parking determination processor, a first target lateral position determination processor, a second street parking determination processor, a second target lateral position determination processor, and a traveling control processor. The obstacle detector is configured to detect whether an obstacle is present in a region that is before the intersection and is on a right-front side relative to the first vehicle. The first street parking determination processor is configured to, when the obstacle is detected, perform a determination as to whether the obstacle is a second vehicle that is street-parked. The first target lateral position determination processor is configured to, when the obstacle is the second vehicle having a high possibility of being street-parked based on a result of the determination performed by the first street parking determination processor, perform a determination of a first target lateral position of the first vehicle at a time when the first vehicle passes the second vehicle. The second street parking determination processor is configured to perform, after the first vehicle starts passing traveling, a determination as to whether the obstacle is the second vehicle that is street-parked. The second target lateral position determination processor is configured to, when the obstacle is the second vehicle that is street-parked based on a result of the determination performed by the second street parking determination processor, perform a determination of a second target lateral position of the first vehicle at the time when the first vehicle passes the second vehicle. The traveling control processor is configured to execute the traveling control based on one or both of a result of the determination performed by the first target lateral position determination processor and a result of the determination performed by the second target lateral position determination processor. The traveling control includes a passing traveling control on the first vehicle, a straight traveling control on the first vehicle, a turn-right traveling control on the first vehicle, and an inter-vehicle distance control on the first vehicle. The passing traveling control is a control of the passing traveling.

An aspect of the disclosure provides a traveling control apparatus to be applied to a first vehicle. The traveling control apparatus is configured to execute a traveling control at an intersection at which the first vehicle is to turn right. The traveling control apparatus includes an obstacle detector and circuitry. The obstacle detector is configured to detect whether an obstacle is present in a region that is before the intersection and is on a right-front side relative to the first vehicle. The circuitry is configured to, when the obstacle is detected, perform a first determination as to whether the obstacle is a second vehicle that is street-parked. The circuitry is configured to, when the obstacle is the second vehicle having a high possibility of being street-parked based on a result of the first determination, perform a determination of a first target lateral position of the first vehicle at a time when the first vehicle passes the second vehicle. The circuitry is configured to, after the first vehicle starts passing traveling, perform a second determination as to whether the obstacle is the second vehicle that is street-parked. The circuitry is configured to, when the obstacle is the second vehicle that is street-parked based on a result of the second determination, perform a determination of a second target lateral position of the first vehicle at the time when the first vehicle passes the second vehicle. The circuitry is configured to execute the traveling control based on one or both of a result of the determination of the first target lateral position and a result of the determination of the second target lateral position. The traveling control includes a passing traveling control on the first vehicle, a straight traveling control on the first vehicle, a turn-right traveling control on the first vehicle, and an inter-vehicle distance control on the first vehicle. The passing traveling control is a control of the passing traveling.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
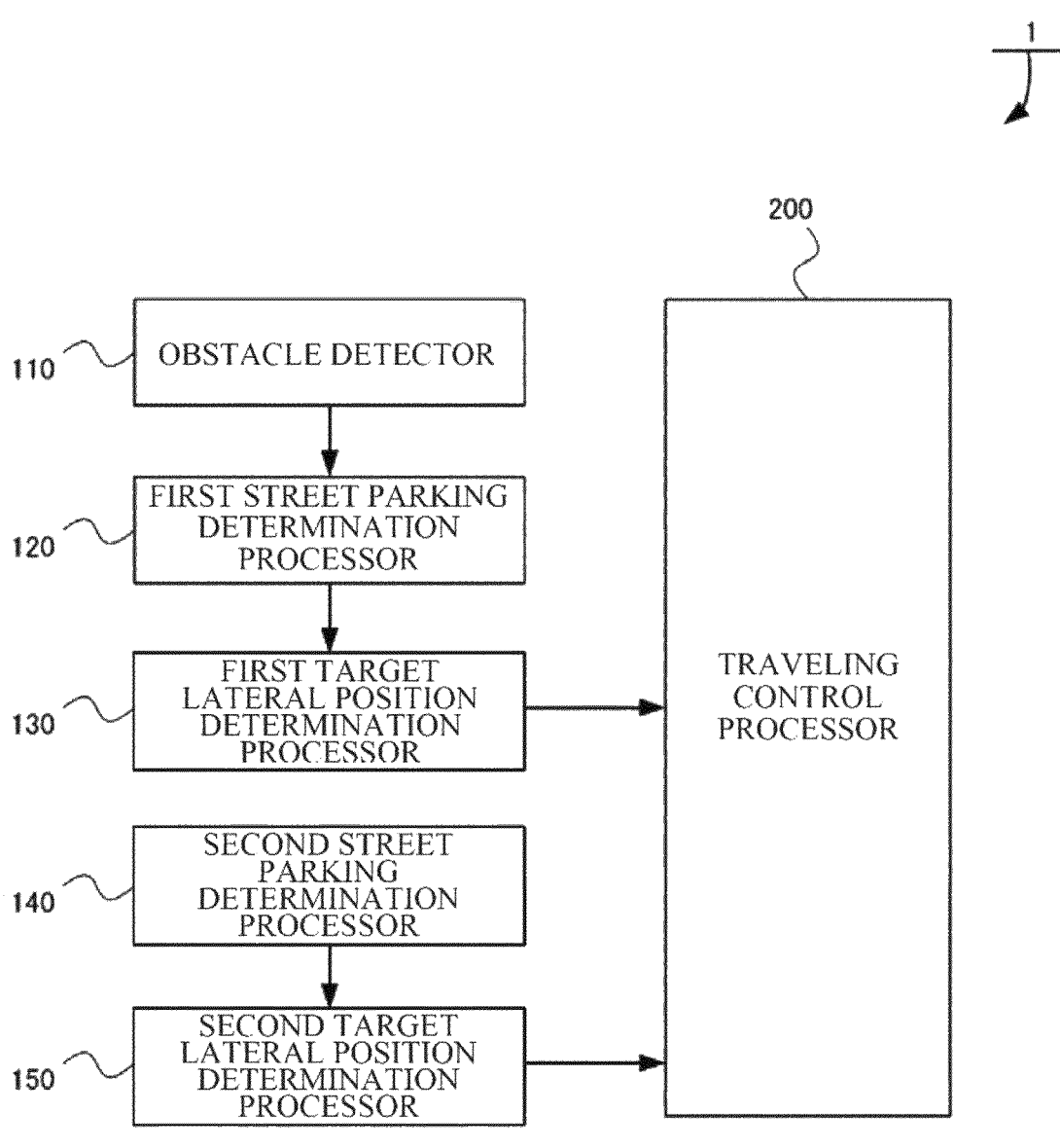
FIG. 1 is a diagram illustrating a configuration of a traveling control apparatus according to one example embodiment of the disclosure.

An advanced driving assistance system such as that disclosed in JP-A No. 2011-162075 still has the following issue. When a vehicle having a possibility of being street-parked is present before an intersection at which a subject vehicle is to turn left, the driving assistance system simply stops the subject vehicle by an adaptive cruise control (ACC), and may not be able to assist the subject vehicle to travel to its destination.

It is desirable to provide a traveling control apparatus that, even when a vehicle having a possibility of being street-parked is present before an intersection at which a subject vehicle is to turn left, allows the subject vehicle to travel through a narrow path before the intersection in accordance with a width of a traveling path on which the subject vehicle is to travel, and executes traveling assistance to a destination.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Example Embodiment

A description is given of a traveling control apparatus 1 according to an example embodiment of the disclosure with reference to FIGS. 1 to 6.

The following example embodiment explains an example of a traveling control apparatus in a case where a subject vehicle travels on a road where drivers keep to the left by law. Needless to say, if the traveling control apparatus is to be applied to a road where drivers keep to the right by law depending on the country or the region, left and right settings or the like may be appropriately set in an opposite manner.

[Configuration of Traveling Control Apparatus 1]

As illustrated in FIG. 1, the traveling control apparatus 1 according to the example embodiment includes an obstacle detector 110, a first street parking determination processor 120, a first target lateral position determination processor 130, a second street parking determination processor 140, a second target lateral position determination processor 150, and a traveling control processor 200.

The obstacle detector 110 may detect whether an obstacle is present in a region that is before an intersection at which a subject vehicle MV is to turn left and is on a left-front side relative to the subject vehicle MV.

For example, the obstacle detector 110 may be an imaging device. For example, the obstacle detector 110 may perform an image analysis on image information related to a region in front of the subject vehicle MV and thereby detect whether an obstacle is present in the region that is before the intersection at which the subject vehicle MV is to turn left and is on the left-front side relative to the subject vehicle MV.

In one example, the obstacle detector 110 may further include a device such as a light detection and ranging (LiDAR) or a millimeter-wave radar in case of a condition such as a bad weather.

If the obstacle detector 110 detects an obstacle, the obstacle detector 110 may supply such a detection result to the first street parking determination processor 120 which will be described later.

The first street parking determination processor 120 may perform, when an obstacle is detected by the obstacle detector 110 in the region that is before the intersection at which the subject vehicle MV is to turn left and is on the left-front side relative to the subject vehicle MV, a determination as to whether the obstacle is another vehicle OV.

If the obstacle is the other vehicle OV, the first street parking determination processor 120 may perform a determination as to whether the other vehicle OV is street-parked, i.e., whether the other vehicle OV is parked on a street.

Figure 4:
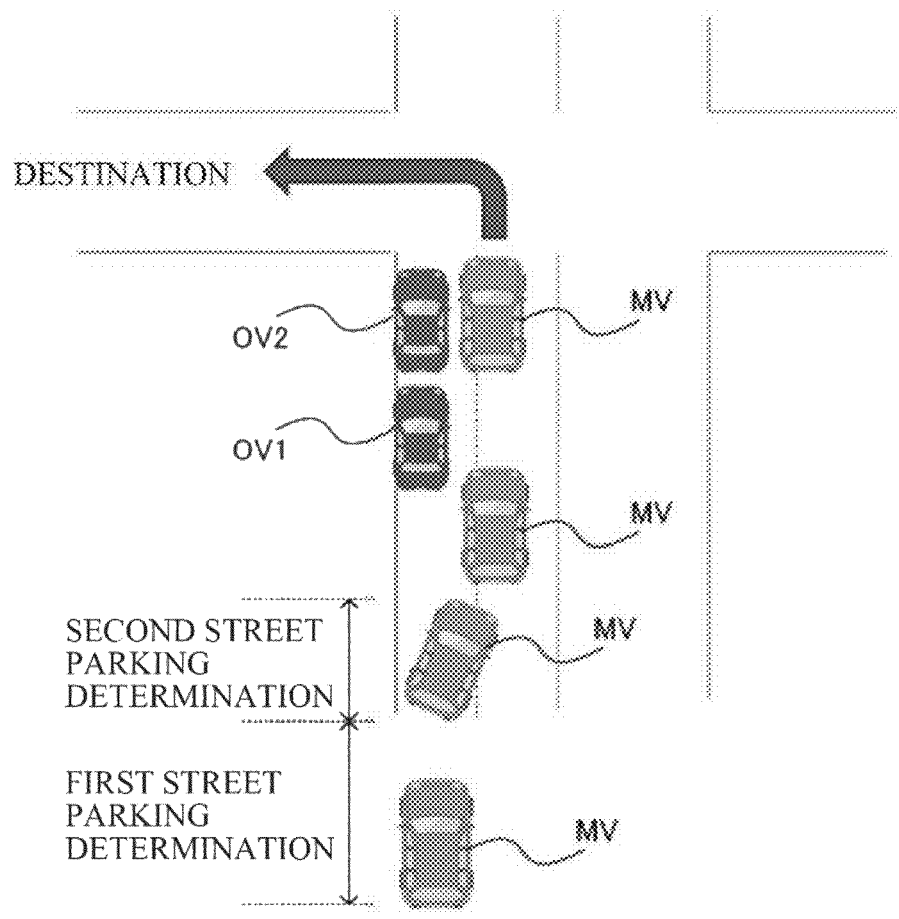
FIG. 4 is a diagram schematically illustrating a first street parking determination process to be executed by the traveling control apparatus according to the example embodiment of the disclosure.

For example, the first street parking determination processor 120 may determine whether other vehicles OV1 and OV2 have a "high possibility of being street-parked", a "possibility of being street-parked", or a "high possibility of not being street-parked" based on pieces of information related to the other vehicles OV1 and OV2 as indices in a first street parking determination zone, as illustrated in FIG. 4. The pieces of information related to the other vehicles OV1 and OV2 may include dynamic behavior of the other vehicles OV1 and OV2, on and off states of hazard lamps of the other vehicles OV1 and OV2, on and off states of signal lights of the other vehicles OV1 and OV2, directions indicated by light emission of the signal lights of the other vehicles OV1 and OV2, directions of tires of the other vehicles OV1 and OV2, presence of drivers of the other vehicles OV1 and OV2, and behavior of the drivers of the other vehicles OV1 and OV2.

In one example, the first street parking determination processor 120 may perform the determination by a method based on the number of satisfied conditions related to the above-described indices. In another example, the first street parking determination processor 120 may determine whether the other vehicles OV1 and OV2 have the "high possibility of being street-parked", the "possibility of being street-parked", or the "high possibility of not being street-parked", based on a comprehensive evaluation value. In obtaining the comprehensive evaluation value, an index having a great influence may be weighted more greatly. The index having a great influence may be, for example, the "presence of the driver".

A result of the determination performed by the first street parking determination processor 120 may be supplied to the first target lateral position determination processor 130 which will be described later.

When the result of the determination performed by the first street parking determination processor 120 indicates that the obstacle is the street-parked other vehicle OV, the first target lateral position determination processor 130 may perform a determination of a first target lateral position of the subject vehicle MV at a time when the subject vehicle MV passes the other vehicle OV.

For example, when the result of the determination performed by the first street parking determination processor 120 indicates the "high possibility of being street-parked", the first target lateral position determination processor 130 may determine that the first target lateral position is to be a position having a small spacing to the other vehicle OV. When the result of the determination performed by the first street parking determination processor 120 indicates the "possibility of being street-parked", the first target lateral position determination processor 130 may determine that the first target lateral position is to be a position having a medium spacing to the other vehicle OV. When the result of the determination performed by the first street parking determination processor 120 indicates the "high possibility of not being street-parked", the first target lateral position determination processor 130 may determine that passing traveling is difficult.

Figure 5:
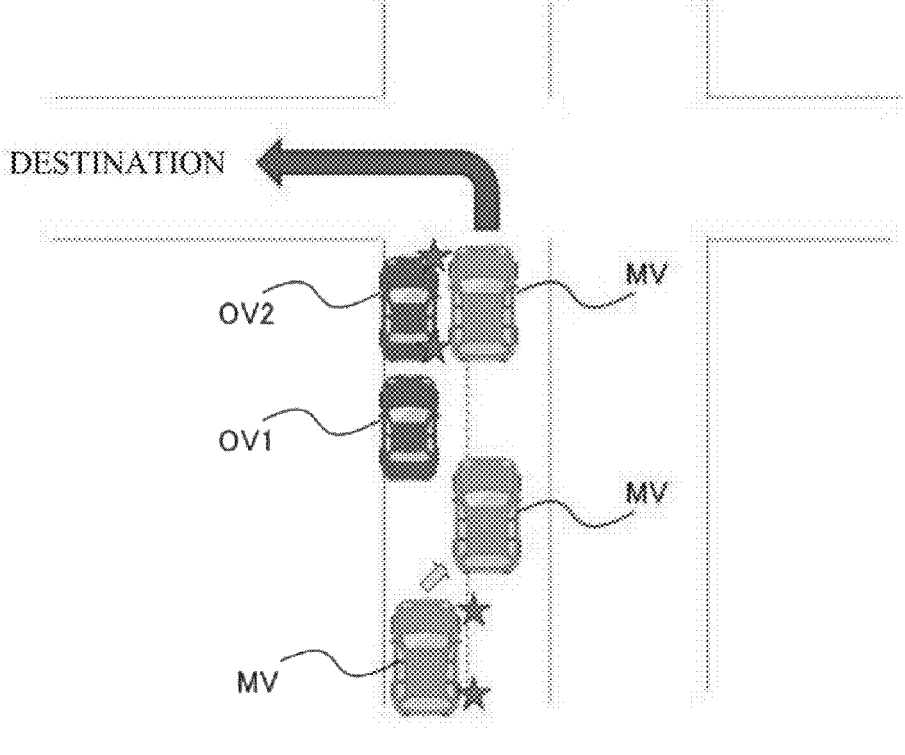
FIG. 5 is a diagram schematically illustrating the first street parking determination process and a second street parking determination process to be executed by the traveling control apparatus according to the example embodiment of the disclosure.

In one example, as illustrated in FIG. 5, if the other vehicles OV1 and OV2 have the "high possibility of being street-parked", the first target lateral position determination processor 130 may determine that the first target lateral position, i.e., a spacing between the subject vehicle MV and the other vehicles OV1 and OV2 in a vehicle-width direction, is to be a small spacing.

If the other vehicles OV1 and OV2 have the "possibility of being street-parked", the first target lateral position determination processor 130 may determine that the first target lateral position, i.e., the spacing between the subject vehicle MV and the other vehicles OV1 and OV2 in the vehicle-width direction, is to be a medium spacing.

The matter determined by the first target lateral position determination processor 130 may be supplied to the traveling control processor 200 which will be described later.

When the result of the determination performed by the first street parking determination processor 120 indicates the "high possibility of being street-parked" or the "possibility of being street-parked", the first target lateral position determination processor 130 may output information related to an on and off control of the signal light in addition to the above-described determined matter.

The second street parking determination processor 140 may perform a determination as to whether the obstacle is the other vehicle OV, after the subject vehicle MV starts the passing traveling.

If the obstacle is the other vehicle OV, the second street parking determination processor 140 may perform a determination as to whether the other vehicle OV is street-parked.

For example, the second street parking determination processor 140 may determine whether the other vehicles OV1 and OV2 are "confirmed to be street-parked", or "confirmed not to be street-parked" based on pieces of information related to the other vehicles OV1 and OV2 as indices in a second street parking determination zone, as illustrated in FIG. 4. The pieces of information related to the other vehicles OV1 and OV2 may include the dynamic behavior of the other vehicles OV1 and OV2, the on and off states of the hazard lamps of the other vehicles OV1 and OV2, the on and off states of the signal lights of the other vehicles OV1 and OV2, the directions indicated by the light emission of the signal lights of the other vehicles OV1 and OV2, the directions of the tires of the other vehicles OV1 and OV2, the presence of the drivers of the other vehicles OV1 and OV2, and the behavior of the drivers of the other vehicles OV1 and OV2.

In one example, the second street parking determination processor 140 may perform the determination by a method based on the number of satisfied conditions related to the above-described indices. In another example, the second street parking determination processor 140 may determine whether the other vehicles OV1 and OV2 are "confirmed to be street-parked", or "confirmed not to be street-parked", based on a comprehensive evaluation value. In obtaining the comprehensive evaluation value, an index having a great influence may be weighted more greatly. The index having a great influence may be, for example, the "presence of the driver".

A result of the determination performed by the second street parking determination processor 140 may be supplied to the second target lateral position determination processor 150 which will be described later.

When the result of the determination performed by the second street parking determination processor 140 indicates that the obstacle is the street-parked other vehicle OV, the second target lateral position determination processor 150 may make a determination of a second target lateral position of the subject vehicle MV at a time when the subject vehicle MV passes the other vehicle OV.

For example, when the result of the determination performed by the second street parking determination processor 140 indicates that the other vehicle OV is "confirmed to be street-parked", the second target lateral position determination processor 150 may determine that the second target lateral position is to be a position having a small spacing to the other vehicle OV. When the result of the determination performed by the second street parking determination processor 140 indicates that the other vehicle OV is "confirmed not to be street-parked", the second target lateral position determination processor 150 may determine that the passing traveling is difficult.

The matter determined by the second target lateral position determination processor 150 may be supplied to the traveling control processor 200 which will be described later.

The traveling control processor 200 may execute a traveling control including a passing traveling control, a straight traveling control, a turn-left traveling control, and an inter-vehicle distance control (an ACC control) on the subject vehicle MV.

In addition, the traveling control processor 200 may also execute a control of turning on the signal light in accordance with the above-described traveling control mode.

Figure 6:
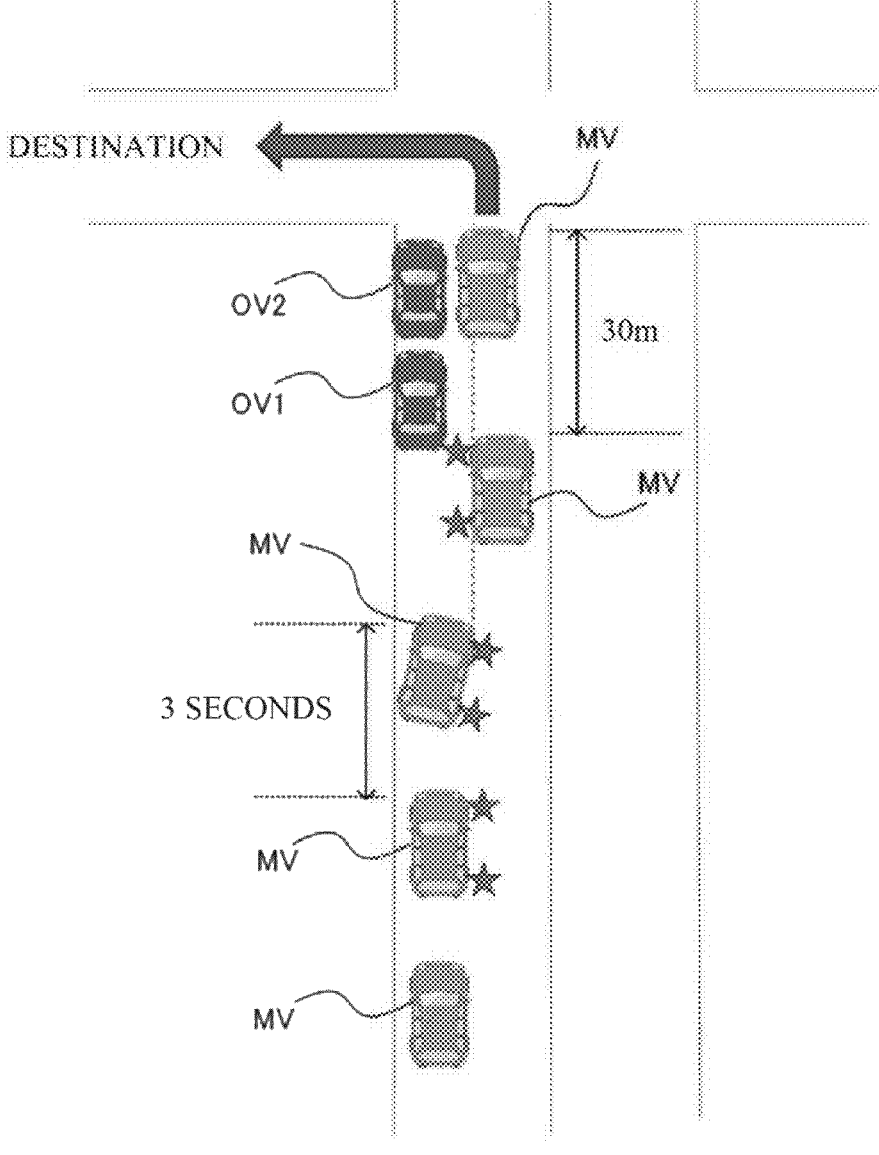
FIG. 6 is a diagram schematically illustrating a process at a time of starting a passing traveling control to be executed by the traveling control apparatus according to the example embodiment of the disclosure.

In one example, as illustrated in FIG. 6, for example, when the first street parking determination processor 120 determines that the other vehicles OV1 and OV2 are vehicles having the high possibility of being street-parked, the traveling control processor 200 may turn on a right signal light before starting a lateral movement for the passing traveling, and may perform the passing traveling control on the subject vehicle MV based on the first target lateral position. When the second street parking determination processor 140 determines that the other vehicles OV1 and OV2 are street-parked vehicles, the traveling control processor 200 may turn off the right signal light, and may perform the straight traveling control and the turn-left traveling control on the subject vehicle MV along the second target lateral position.

For example, when the first street parking determination processor 120 determines that the other vehicles OV1 and OV2 are vehicles having the high possibility of being street-parked, the traveling control processor 200 may turn on the right signal light before starting the lateral movement for the passing traveling, and may perform the passing traveling control on the subject vehicle MV based on the first target lateral position. When the second street parking determination processor 140 determines that the other vehicles OV1 and OV2 are not street-parked vehicles, the traveling control processor 200 may execute the inter-vehicle distance control (the ACC control).

Here, the timing before starting the lateral movement may be, for example, a timing three seconds before starting the lateral movement.

For example, the Japanese road traffic act mandates that when the subject vehicle MV is to start a lateral movement in order to change the course of the subject vehicle MV, a signal light on the side of the traffic lane which the subject vehicle MV is to enter should be turned on three or more seconds before starting the lateral movement.

In other words, the subject vehicle MV is to travel on the traffic lane on which the subject vehicle MV is currently traveling without changing its course at least for three seconds after turning on the signal light.

For example, when the first street parking determination processor 120 determines that the other vehicles OV1 and OV2 are vehicles having the low possibility of being street-parked, the traveling control processor 200 may execute the inter-vehicle distance control (the ACC control).

As illustrated in FIG. 6, upon executing the turn-left traveling control on the subject vehicle MV, the traveling control processor 200 may turn on a left signal light 30 *m* before turning left at the intersection.

[Process to be Executed by Traveling Control Apparatus 1]

Figure 2:
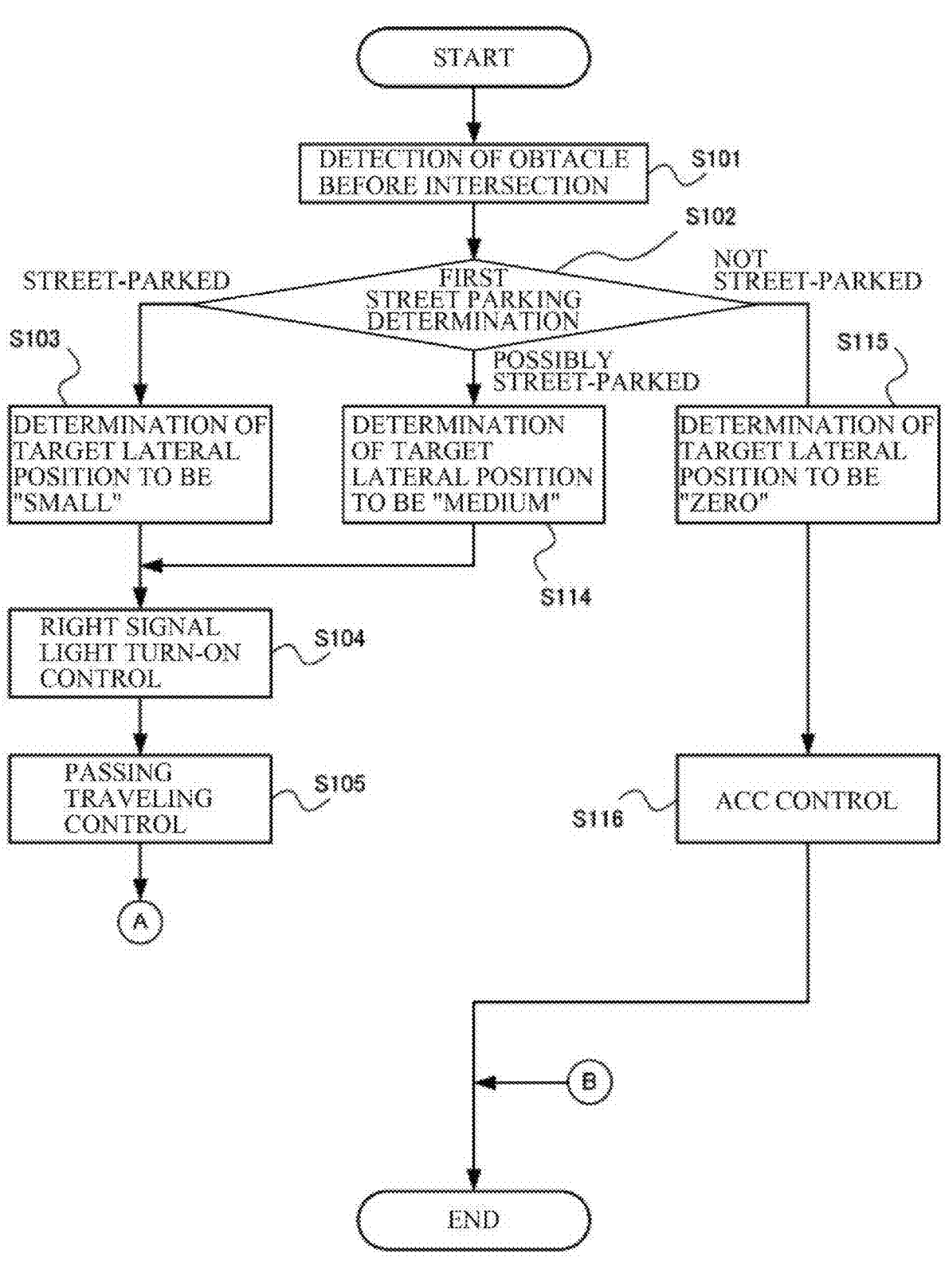
FIG. 2 is a flowchart illustrating a process to be executed by the traveling control apparatus according to the example embodiment of the disclosure.
Figure 3:
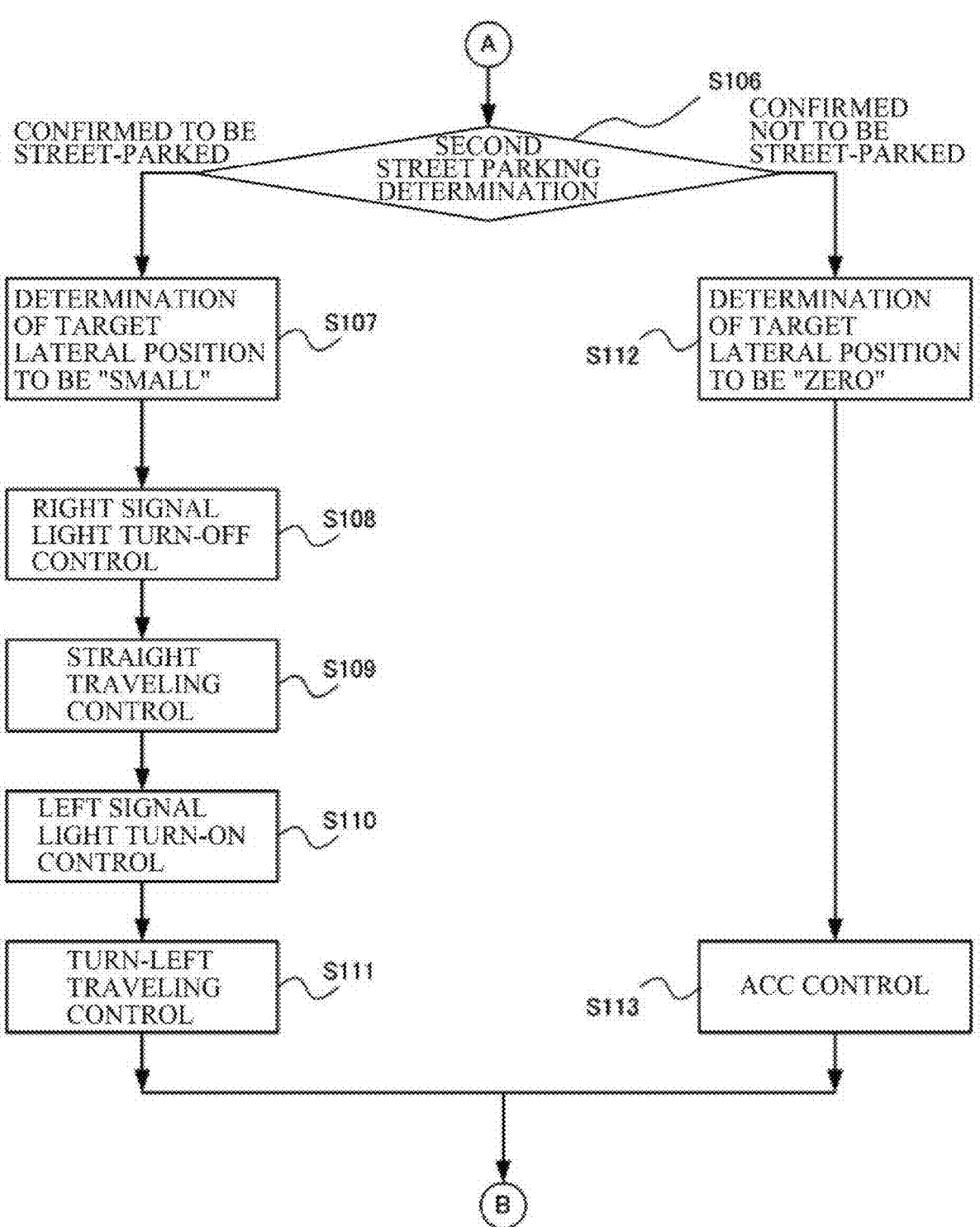
FIG. 3 is a flowchart illustrating the process to be executed by the traveling control apparatus according to the example embodiment of the disclosure.

A description is given of a process to be executed by the traveling control apparatus 1 according to the example embodiment, with reference to FIGS. 2 and 3.

As illustrated in FIG. 2, the obstacle detector 110 may detect an obstacle before an intersection at which the subject vehicle MV is to turn left (step S101). The obstacle detector 110 may supply information related to the detection of the obstacle to the first street parking determination processor 120.

The first street parking determination processor 120 may determine that the obstacle detected by the obstacle detector 110 is another vehicle OV, and may determine whether the other vehicle OV is a street-parked vehicle (step S102).

If the first street parking determination processor 120 determines that the other vehicle OV is a street-parked vehicle, the first street parking determination processor 120 may supply the first target lateral position determination processor 130 with a notification that the other vehicle OV is a street-parked vehicle.

Upon receiving the notification that the other vehicle OV is a street-parked vehicle from the first street parking determination processor 120, the first target lateral position determination processor 130 may determine that the first target lateral position is to be a position having a small spacing to the other vehicle OV ("small") (step S103).

The first target lateral position determination processor 130 may supply the traveling control processor 200 with information that the first target lateral position is determined as being to be the position having the small spacing to the other vehicle OV.

Upon receiving, from the first target lateral position determination processor 130, the information that the first target lateral position is determined as being to be the position having the small spacing to the other vehicle OV, the traveling control processor 200 may execute a control of turning on the right signal light (step S104). In addition, the traveling control processor 200 may execute the passing traveling control on the subject vehicle MV (step S105).

Thereafter, the second street parking determination processor 140 may perform, after the subject vehicle MV starts the passing traveling, a determination as to whether the obstacle before the intersection at which the subject vehicle MV is to turn left is the other vehicle OV and whether the other vehicle OV is a street-parked vehicle (step S106). If the second street parking determination processor 140 determines that the other vehicle OV is a street-parked vehicle (that the other vehicle OV is confirmed to be a street-parked vehicle), the second street parking determination processor 140 may supply the second target lateral position determination processor 150 with a notification that the other vehicle OV is a street-parked vehicle (that the other vehicle OV is confirmed to be a street-parked vehicle).

Upon receiving, from the second street parking determination processor 140, the notification that the other vehicle OV is a street-parked vehicle, the second target lateral position determination processor 150 may determine that the second target lateral position is to be a position having a small spacing to the other vehicle OV ("small") (step S107).

The second target lateral position determination processor 150 may supply the traveling control processor 200 with information that the second target lateral position is determined as being to be the position having the small spacing to the other vehicle OV.

Upon receiving, from the second target lateral position determination processor 150, the information that the second target lateral position is determined as being to be the position having the small spacing to the other vehicle OV, the traveling control processor 200 may execute a control of turning off the right signal light (step S108). In addition, the traveling control processor 200 may execute the straight traveling control on the subject vehicle MV (step S109).

The traveling control processor 200 may check whether the subject vehicle MV has reached a target position to turn left (a position 30 *m* before the intersection), and if the traveling control processor 200 determines that the subject vehicle MV has reached the target position, the traveling control processor 200 may execute a control of turning on the left signal light (step S110). In addition, the traveling control processor 200 may execute the turn-left traveling control on the subject vehicle MV (step S111). Thereafter, the traveling control processor 200 may end the series of processes.

In contrast, if the second street parking determination processor 140 determines that the other vehicle OV is not a street-parked vehicle (step S106), the second street parking determination processor 140 may supply the second target lateral position determination processor 150 with a notification that the other vehicle OV is not a street-parked vehicle.

Upon receiving, from the second street parking determination processor 140, the notification that the other vehicle OV is not a street-parked vehicle, the second target lateral position determination processor 150 may determine that the second target lateral position is to be zero (step S112).

The second target lateral position determination processor 150 may supply the traveling control processor 200 with information that the second target lateral position is determined as being to be zero.

Upon receiving, from the second target lateral position determination processor 150, the information that the second target lateral position is determined as being to be zero with respect to the other vehicle OV, the traveling control processor 200 may execute the inter-vehicle distance control (the ACC control) on the subject vehicle MV (step S113). Thereafter, the traveling control processor 200 may end the series of processes.

In the process described in FIG. 2, if the first street parking determination processor 120 determines that the other vehicle OV has the possibility of being street-parked, the first street parking determination processor 120 may supply the first target lateral position determination processor 130 with a notification that the other vehicle OV has the possibility of being street-parked.

Upon receiving the notification that the other vehicle OV has the possibility of being street-parked from the first street parking determination processor 120, the first target lateral position determination processor 130 may determine that the first target lateral position is to be a position having a medium spacing to the other vehicle OV ("medium") (step S114).

The first target lateral position determination processor 130 may supply the traveling control processor 200 with information that the first target lateral position is determined as being to be the position having the medium spacing to the other vehicle OV.

Upon receiving, from the first target lateral position determination processor 130, the information that the first target lateral position is determined as being to be the position having the medium spacing to the other vehicle OV, the traveling control processor 200 may execute a control of turning on the right signal light (step S104). In addition, the traveling control processor 200 may execute the passing traveling control on the subject vehicle MV (step S105).

Thereafter, the second street parking determination processor 140 may perform, after the subject vehicle MV starts the passing traveling, a determination as to whether the obstacle before the intersection at which the subject vehicle MV is to turn left is the other vehicle OV and whether the other vehicle OV is a street-parked vehicle (step S106). If the second street parking determination processor 140 determines that the other vehicle OV is a street-parked vehicle (that the other vehicle OV is confirmed to be a street-parked vehicle), the second street parking determination processor 140 may supply the second target lateral position determination processor 150 with a notification that the other vehicle OV is a street-parked vehicle (that the other vehicle OV is confirmed to be a street-parked vehicle).

Upon receiving, from the second street parking determination processor 140, the notification that the other vehicle OV is a street-parked vehicle, the second target lateral position determination processor 150 may determine that the second target lateral position is to be a position having a small spacing to the other vehicle OV ("small") (step S107).

The second target lateral position determination processor 150 may supply the traveling control processor 200 with information that the second target lateral position is determined as being to be the position having the small spacing to the other vehicle OV.

Upon receiving, from the second target lateral position determination processor 150, the information that the second target lateral position is determined as being to be the position having the small spacing to the other vehicle OV, the traveling control processor 200 may execute a control of turning off the right signal light (step S108). In addition, the traveling control processor 200 may execute the straight traveling control on the subject vehicle MV (step S109).

The traveling control processor 200 may check whether the subject vehicle MV has reached the target position to turn left (the position 30 m before the intersection), and if the traveling control processor 200 determines that the subject vehicle MV has reached the target position, the traveling control processor 200 may execute a control of turning on the left signal light (step S110). In addition, the traveling control processor 200 may execute the turn-left traveling control on the subject vehicle MV (step S111). Thereafter, the traveling control processor 200 may end the series of processes.

After the subject vehicle MV starts the passing traveling, the second street parking determination processor 140 determines whether the obstacle is the other vehicle OV (step S106). If the second street parking determination processor 140 determines that the other vehicle OV is not a street-parked vehicle, the second street parking determination processor 140 may supply the second target lateral position determination processor 150 with a notification that the other vehicle OV is not a street-parked vehicle.

Upon receiving, from the second street parking determination processor 140, the notification that the other vehicle OV is not a street-parked vehicle, the second target lateral position determination processor 150 may determine that the second target lateral position is to be zero (step S112).

The second target lateral position determination processor 150 may supply the traveling control processor 200 with information that the second target lateral position is determined as being to be zero.

Upon receiving, from the second target lateral position determination processor 150, the information that the second target lateral position is determined as being to be zero with respect to the other vehicle OV, the traveling control processor 200 may execute the inter-vehicle distance control (the ACC control) on the subject vehicle MV (step S113). Thereafter, the traveling control processor 200 may end the series of processes.

In the process described in FIG. 2, upon receiving, from the first street parking determination processor 120, the notification that the other vehicle OV is not a street-parked vehicle, the first target lateral position determination processor 130 may determine that the first target lateral position is to be zero with respect to the other vehicle OV (step S115).

The first target lateral position determination processor 130 may supply the traveling control processor 200 with information that the first target lateral position is determined as being to be zero with respect to the other vehicle OV.

Upon receiving, from the first target lateral position determination processor 130, the information that the first target lateral position is determined as being to be zero with respect to the other vehicle OV, the traveling control processor 200 may execute the inter-vehicle distance control (the ACC control) on the subject vehicle MV (step S116). Thereafter, the traveling control processor 200 may end the series of processes.

Example Workings and Example Effects

As described above, the traveling control apparatus 1 according to the example embodiment includes: the obstacle detector 110 configured to detect whether an obstacle is present in a region that is before the intersection and is on a left-front side relative to the subject vehicle MV; the first street parking determination processor 120 configured to, when the obstacle is detected, perform a determination as to whether the obstacle is another vehicle OV that is street-parked; the first target lateral position determination processor 130 configured to, when the obstacle is the other vehicle OV having a high possibility of being street-parked based on a result of the determination performed by the first street parking determination processor 120, perform a determination of a first target lateral position of the subject vehicle MV at a time when the subject vehicle MV passes the other vehicle OV; the second street parking determination processor 140 configured to perform, after the subject vehicle MV starts passing traveling, a determination as to whether the obstacle is the other vehicle OV that is street-parked; the second target lateral position determination processor 150 configured to, when the obstacle is the other vehicle OV that is street-parked based on a result of the determination performed by the second street parking determination processor 140, perform a determination of a second target lateral position of the subject vehicle MV at the time when the subject vehicle MV passes the other vehicle OV; and the traveling control processor 200 configured to execute the traveling control based on one or both of a result of the determination performed by the first target lateral position determination processor 130 and a result of the determination performed by the second target lateral position determination processor 150, the traveling control including a passing traveling control on the subject vehicle MV, a straight traveling control on the subject vehicle MV, a turn-left traveling control on the subject vehicle MV, and an inter-vehicle distance control on the subject vehicle MV, the passing traveling control being a control of the passing traveling.

That is, the first street parking determination processor 120 performs, when the obstacle is detected in the region that is before the intersection and is on the left-front side relative to the subject vehicle MV, the determination as to whether the obstacle is the other vehicle OV that is street-parked. The first target lateral position determination processor 130 performs, when the obstacle is the other vehicle OV having the high possibility of being street-parked based on the result of the determination performed by the first street parking determination processor 120, the determination of the first target lateral position of the subject vehicle MV at the time when the subject vehicle MV passes the other vehicle OV. The traveling control processor 200 may start the passing traveling control on the subject vehicle MV based on the result of the determination performed by the first target lateral position determination processor 130.

Thus, when the obstacle in the region that is before the intersection and is on the left-front side relative to the subject vehicle MV is the other vehicle OV having the high possibility of being street-parked, the first target lateral position of the subject vehicle MV at the time when the subject vehicle MV passes the other vehicle OV is determined, and the traveling control processor 200 may start the passing traveling control on the subject vehicle MV based on the determined first target lateral position. This allows the subject vehicle MV to travel through a narrow path before the intersection in accordance with a width of a traveling path on which the subject vehicle MV is to travel, and allows for execution of traveling assistance to a destination.

In addition, the second street parking determination processor 140 performs, after the subject vehicle MV starts the passing traveling, the determination as to whether the obstacle is the other vehicle OV that is street-parked. The second target lateral position determination processor 150 performs, when the obstacle is the other vehicle OV that is street-parked, the determination of the second target lateral position of the subject vehicle MV at the time when the subject vehicle MV passes the other vehicle OV. The traveling control processor 200 may perform the passing traveling control on the subject vehicle MV based on the result of the determination performed by the second target lateral position determination processor 150.

That is, after starting the passing traveling of the subject vehicle MV based on the result of the determination performed by the first target lateral position determination processor 130, the traveling control processor 200 may further perform a determination as to whether the passing traveling control on the subject vehicle MV is possible based on a result of the determination performed by the second target lateral position determination processor 150. If the control is to be continued, the traveling control processor 200 may continue the control based on the result of the determination performed by the second target lateral position determination processor 150.

Accordingly, the traveling control processor 200 may perform the traveling control on the subject vehicle MV while sufficiently considering whether the other vehicle OV parked in the region that is before the intersection and is on the left-front side relative to the subject vehicle MV is street-parked. This allows the subject vehicle MV to travel through a narrow path before the intersection in accordance with a width of a traveling path on which the subject vehicle MV is to travel, and allows for execution of traveling assistance to a destination.

Further, the traveling control processor 200 executing the above-described traveling control on the subject vehicle MV allows for a control corresponding to a surrounding environment. It is therefore possible to secure safety of a road user around the subject vehicle MV.

Further, the traveling control processor 200 of the traveling control apparatus 1 according to the example embodiment may turn on a right signal light and may execute the passing traveling control on the subject vehicle MV based on the first target lateral position, when the first street parking determination processor 120 determines that the other vehicle OV is a vehicle having the high possibility of being street-parked. In addition, the traveling control processor 200 may turn off the right signal light and may execute the straight traveling control and the turn-left traveling control on the subject vehicle MV along the second target lateral position, when the second street parking determination processor 140 determines that the other vehicle OV is a vehicle that is street-parked.

Thus, the traveling control processor 200 may automatically control, for example: the lateral position of the subject vehicle MV relative to the other vehicle OV that is a vehicle having the high possibility of being street-parked or is a street-parked vehicle; an operation or non-operation of the signal light; and an operation timing of the signal light. This makes it possible to execute safety traveling of the subject vehicle MV through the narrow path and the travel assistance to a destination.

Further, the traveling control processor 200 executing the above-described traveling control allows for a control corresponding to a surrounding environment. It is therefore possible to secure safety of a road user around the subject vehicle MV.

Further, the traveling control processor 200 of the traveling control apparatus 1 according to the example embodiment may turn on the right signal light and may execute the passing traveling control on the subject vehicle MV based on the first target lateral position, when the first street parking determination processor 120 determines that the other vehicle OV is a vehicle having the high possibility of being street-parked. The traveling control processor 200 may execute the inter-vehicle distance control, when the second street parking determination processor 140 determines that the other vehicle OV is not a vehicle that is street-parked.

That is, when the first street parking determination processor 120 determines that the other vehicle OV is a vehicle having the high possibility of being street-parked, the traveling control processor 200 may turn on the right signal light and may start the passing traveling control on the subject vehicle MV. However, when the second street parking determination processor 140 determines that the other vehicle OV is not a street-parked vehicle, the traveling control processor 200 may swiftly switch the traveling control mode to the inter-vehicle distance control (the ACC control).

Thus, the traveling control processor 200 executing an appropriate control depending on the situation allows for a control corresponding to a surrounding environment. It is therefore possible to secure safety of a road user around the subject vehicle MV.

Further, appropriately notifying an occupant of the subject vehicle MV of the change in the traveling control mode makes it possible to allow the occupant to understand the situation and to give the occupant a feeling of security.

Further, the traveling control processor 200 of the traveling control apparatus 1 according to the example embodiment may execute the inter-vehicle distance control (the ACC control) when the first street parking determination processor 120 determines that the other vehicle OV is a vehicle having a low possibility of being street-parked.

Thus, the traveling control processor 200 executing an appropriate control depending on the situation allows for a control corresponding to a surrounding environment. It is therefore possible to secure safety of a road user around the subject vehicle MV.

Further, appropriately notifying an occupant of the subject vehicle MV of the change in the traveling control mode makes it possible to allow the occupant to understand the situation and to give the occupant a feeling of security.

Further, one or both of the first street parking determination processor 120 and the second street parking determination processor 140 of the traveling control apparatus 1 according to the example embodiment may perform a determination as to whether the other vehicle OV is street-parked based on information related to the other vehicle OV. The information related to the other vehicle OV may include the information related to dynamic behavior of the other vehicle OV, the information related to an on and off state of a hazard lamp of the other vehicle OV, the information related to an on and off state of a signal light of the other vehicle OV, the information related to a direction indicated by light emission of the signal light of the other vehicle OV, the information related to a direction of a tire of the other vehicle OV, the information related to presence of a driver of the other vehicle OV, and the information related to behavior of the driver of the other vehicle OV.

Thus, the first street parking determination processor 120 and the second street parking determination processor 140 may evaluate any assumable determination factor and thereby determine whether the other vehicle OV is a street-parked vehicle.

Accordingly, it is expectable that the first street parking determination processor 120 and the second street parking determination processor 140 perform accurate determinations as to whether the other vehicle OV is a street-parked vehicle. Thus, the traveling control processor 200 is able to perform a control corresponding to a surrounding environment. It is therefore possible to secure safety of a road user around the subject vehicle MV.

[Modification 1]

In the example embodiment, described is an example in which, when the first street parking determination processor 120 determines that the other vehicles OV1 and OV2 are vehicles having the high possibility of being street-parked, the traveling control processor 200 may turn on the right signal light three seconds before the subject vehicle MV starts the lateral movement for the passing traveling. However, the traveling control processor 200 may make the timing to turn on the right signal light earlier in such a case.

Making the timing to turn on the right signal light earlier as described above allows for a control corresponding to a surrounding environment. It is therefore possible to secure safety of a road user around the subject vehicle MV.

In some embodiments, it is possible to implement the traveling control apparatus 1 of the example embodiment of the disclosure by recording the process to be executed by the traveling control processor 200 on a non-transitory recording medium readable by a computer system, and causing the computer system to load the program recorded on the non-transitory recording medium onto the traveling control processor 200 to execute the program. The computer system as used herein may encompass an operating system (OS) and a hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

Each of the first street parking determination processor 120, the first target lateral position determination processor 130, the second street parking determination processor 140, the second target lateral position determination processor 150, and the traveling control processor 200 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the first street parking determination processor 120, the first target lateral position determination processor 130, the second street parking determination processor 140, the second target lateral position determination processor 150, and the traveling control processor 200 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the first street parking determination processor 120, the first target lateral position determination processor 130, the second street parking determination processor 140, the second target lateral position determination processor 150, the traveling control processor 200 illustrated in FIG. 1.

The invention claimed is:

1. A traveling control apparatus to be applied to a first vehicle, the traveling control apparatus comprising:
  a traveling control processor configured to execute a traveling control at an intersection at which the first vehicle is to turn right;
  an obstacle detector configured to detect whether an obstacle is present in a region that is located ahead of the first vehicle in a same lane, before the intersection and is on a right-front side relative to the first vehicle; and
  a first target lateral position determination processor configured to:
    receive a first signal indicating that the obstacle is a second vehicle having a first possibility of being street-parked; and
    set, based on the first signal, a first target lateral position at which the first vehicle is to pass beside the second vehicle,
  wherein the traveling control processor is further configured to, upon set of the first target lateral position, control a turn signal light to turn on a left signal light, and start, based on the first target lateral position, executing a passing traveling control on the first vehicle,
  wherein the traveling control apparatus further comprises a second target lateral position determination processor configured to:
    receive a second signal, after start of the passing traveling control, that confirms the second vehicle is street-parked; and
    set, based on the second signal, a second target lateral position at which the first vehicle is to pass beside to the second vehicle, and
  wherein the traveling control processor is further configured to, upon set of the second target lateral position, turn off the left signal light, and execute, based on the second target lateral position, a straight traveling control and a turn-right traveling control on the first vehicle.

2. The traveling control apparatus according to claim 1, wherein
  the first target lateral position determination processor is further configured to:
    receive a third signal, after the start of the passing traveling control, that confirms the second vehicle is not street-parked; and
    set, based on the third signal, a third target lateral position at which the first vehicle remains behind the second vehicle without executing the passing traveling control, and
  the traveling control processor is further configured to, based on the third target lateral position, execute an inter-vehicle distance control such that a predetermined inter-vehicle distance is maintained between the first vehicle and the second vehicle.

3. The traveling control apparatus according to claim 2, wherein
  the first target lateral position determination processor is further configured to:
    receive a fourth signal indicating that the obstacle is the second vehicle having a second possibility of being street-parked, the second possibility indicating that the second vehicle is less likely to be street-parked than the first possibility; and
    set, based on the fourth signal, the third target lateral position at which the first vehicle remains behind the second vehicle without executing the passing traveling control, and
  the traveling control processor is further configured to, based on the third target lateral position, execute the inter-vehicle distance control such that the predetermined inter-vehicle distance is maintained between the first vehicle and the second vehicle.

4. The traveling control apparatus according to claim 1, wherein information related to the second vehicle comprising information related to dynamic behavior of the second vehicle, information related to on and off states of a hazard lamp of the second vehicle, information related to on and off states of a signal light of the second vehicle, information related to a direction indicated by light emission of the signal light of the second vehicle, information related to a direction of a tire of the second vehicle, information related to presence of a driver of the second vehicle, and information related to behavior of the driver of the second vehicle are used for determination of a possibility that the second vehicle is street-parked.

5. The traveling control apparatus according to claim 2, wherein information related to the second vehicle comprising information related to dynamic behavior of the second vehicle, information related to on and off states of a hazard lamp of the second vehicle, information related to on and off states of a signal light of the second vehicle, information related to a direction indicated by light emission of the signal light of the second vehicle, information related to a direction of a tire of the second vehicle, information related to presence of a driver of the second vehicle, and information related to behavior of the driver of the second vehicle are used for determination of a possibility that the second vehicle is street-parked.

6. The traveling control apparatus according to claim 3, wherein information related to the second vehicle comprising information related to dynamic behavior of the second vehicle, information related to on and off states of a hazard lamp of the second vehicle, information related to on and off states of a signal light of the second vehicle, information related to a direction indicated by light emission of the signal light of the second vehicle, information related to a direction of a tire of the second vehicle, information related to presence of a driver of the second vehicle, and information related to behavior of the driver of the second vehicle are used for determination of a possibility that the second vehicle is street-parked.

7. A traveling control apparatus to be applied to a first vehicle, the traveling control apparatus comprising:
  an obstacle detector configured to detect whether an obstacle is present in a region that is located ahead of the first vehicle in a same lane, before an intersection and is on a right-front side relative to the first vehicle; and
  circuitry configured to:

US 12,570,289 B2

17 execute a traveling control at the intersection at which the first vehicle is to turn right;

receive a first signal indicating that the obstacle is a second vehicle having a first possibility of being street-parked; 5 set, based on the first signal, a first target lateral position at which the first vehicle is to pass beside the second vehicle;

upon set of the first target lateral position, control a turn signal light to turn on a left signal light, and start, 10 based on the first target lateral position, executing a passing traveling control on the first vehicle;

receive a second signal, after start of the passing traveling control, that confirms the second vehicle is street-parked; and 15 set, based on the second signal, a second target lateral position at which the first vehicle is to pass beside the second vehicle, and upon set of the second target lateral position, turn off the left signal light, and execute, based on the second 20 target lateral position, a straight traveling control and a turn-right traveling control on the first vehicle.

\* \* \* \* \*

18